(12) United States Patent  (10) Patent No.: US 7,748,943 B2
Studer  (45) Date of Patent: Jul. 6, 2010

(54) VEHICLE-MOUNTED LIFTING SYSTEM

(76) Inventor: Ronald M. Studer, 1820 E. Mansfield St., Bucyrus, OH (US) 44820

( * ) Notice: Subject to any disclaimer, the term of this patent is extended or adjusted under 35 U.S.C. 154(b) by 277 days.

(21) Appl. No.: 11/079,430

(22) Filed: Mar. 14, 2005

(65) Prior Publication Data

US 2005/0220584 A1  Oct. 6, 2005

Related U.S. Application Data

(60) Provisional application No. 60/552,516, filed on Mar. 12, 2004.

(51) Int. Cl.
*B60P 1/44* (2006.01)
(52) U.S. Cl. .................................................. 414/542
(58) Field of Classification Search ................ 414/556, 414/542, 545
See application file for complete search history.

(56) References Cited

U.S. PATENT DOCUMENTS

| | | | | |
|---|---|---|---|---|
| 2,536,080 A | * | 1/1951 | Patton | 414/545 |
| 3,416,677 A | * | 12/1968 | Abfalter | 414/545 |
| 3,552,587 A | * | 1/1971 | Warren | 244/137.1 |
| 3,608,759 A | * | 9/1971 | Spurgeon et al. | 414/462 |
| 4,083,429 A | * | 4/1978 | Abbott | 414/541 |
| 4,239,440 A | * | 12/1980 | James | 414/542 |
| 5,127,520 A | * | 7/1992 | Thomas | 206/303 |
| 5,346,355 A | * | 9/1994 | Riemer | 414/542 |
| 5,588,729 A | * | 12/1996 | Berger | 312/334.4 |
| 5,984,050 A | * | 11/1999 | Ronald | 187/226 |
| 6,059,527 A | * | 5/2000 | Ranken et al. | 414/545 |
| 6,599,078 B1 | * | 7/2003 | Elder | 414/542 |
| 6,666,643 B1 | * | 12/2003 | Heynssens | 414/542 |
| 7,048,491 B2 | * | 5/2006 | Windbergs | 414/542 |
| 2003/0091418 A1 | * | 5/2003 | Ranken et al. | 414/545 |

\* cited by examiner

*Primary Examiner*—Charles A Fox
(74) *Attorney, Agent, or Firm*—Pearne & Gordon LLP

(57) ABSTRACT

Provided is a lifting system for a vehicle comprising a first track mounted within said vehicle, a second track mounted within said vehicle, a first lifting arm extendable from said first track, a second lifting arm extendable from said second track, a first windable support extendable from said first lifting arm, and a second windable support extendable from said second lifting arm.

6 Claims, 6 Drawing Sheets

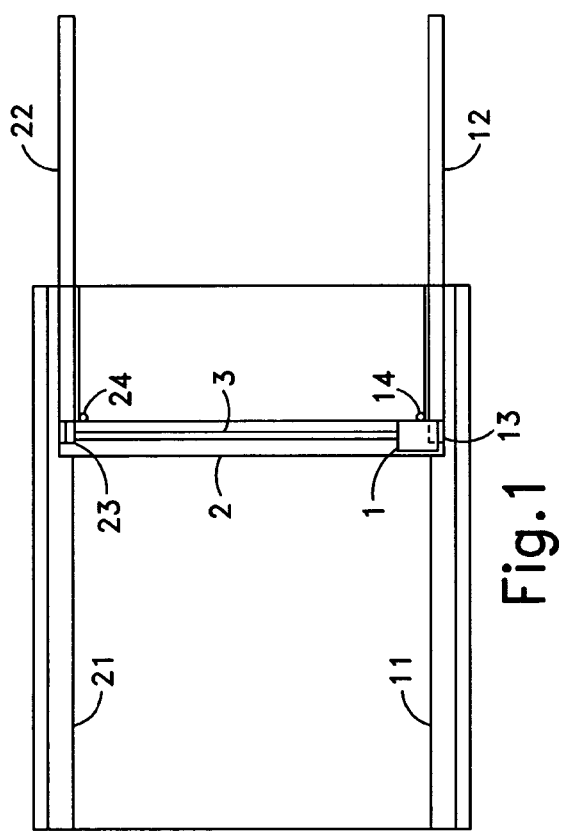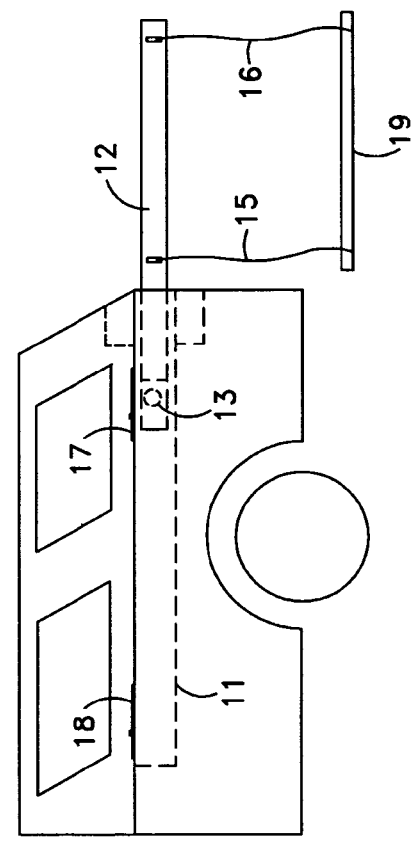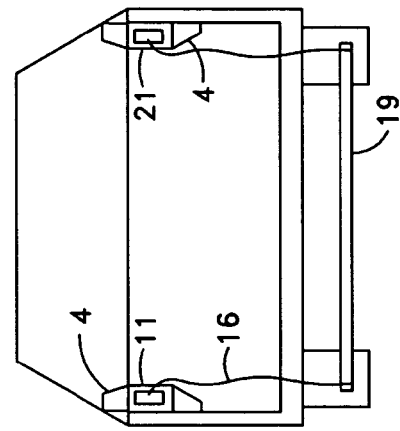

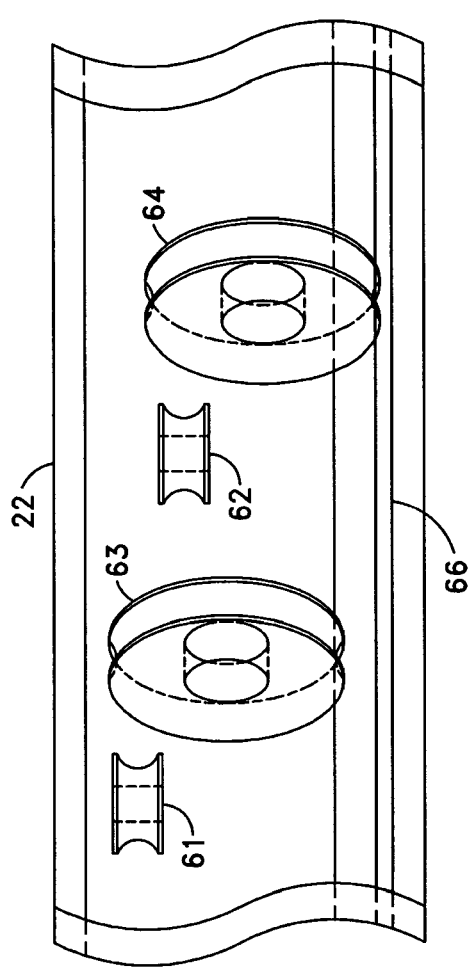
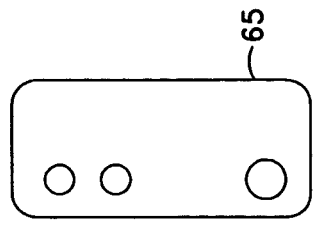
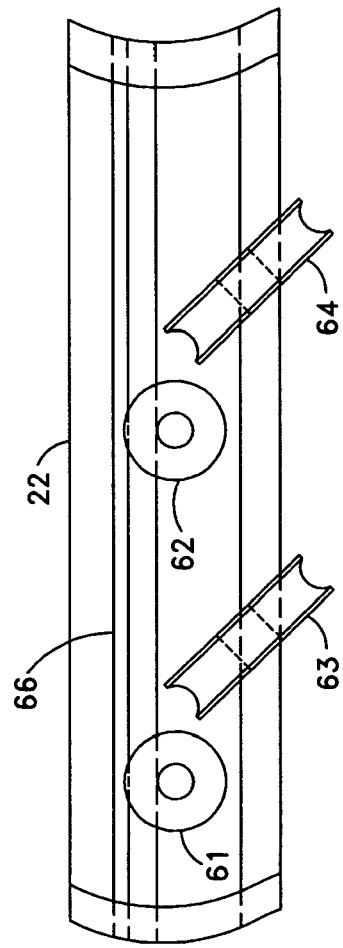

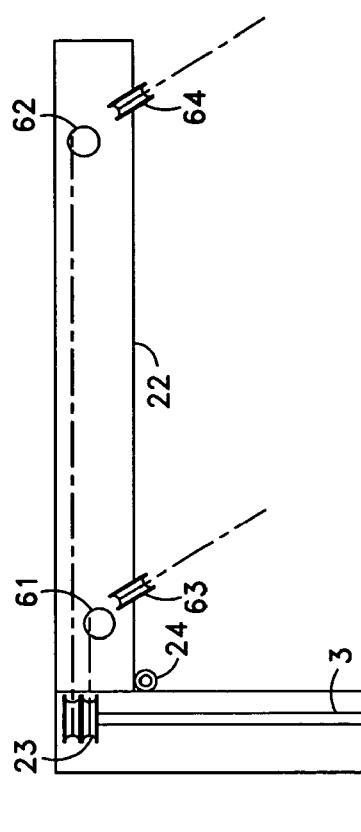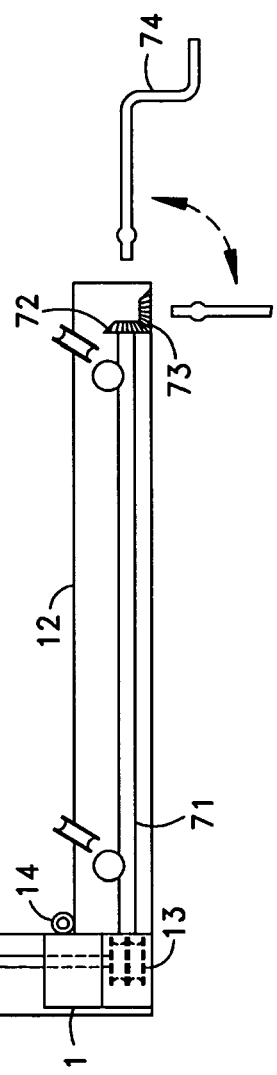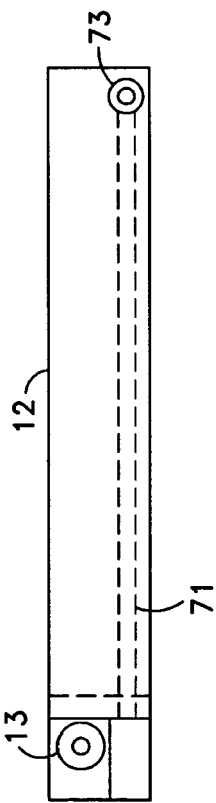

VEHICLE-MOUNTED LIFTING SYSTEM

STATEMENT OF RELATED APPLICATIONS

Benefit of priority of Provisional Patent Application Ser. No. 60/552,516 filed on Mar. 12, 2004 is claimed and is incorporated herein by reference. Non-provisional patent application Ser. No. 11/036,681 filed on Jan. 14, 2005 is incorporated herein by reference.

FIELD OF THE INVENTION

This application relates generally to a lifting system suitable for mounting in a vehicle or trailer.

More specifically, this application relates to a lifting system for installation in a van, sport utility vehicle, truck, or trailer. The system includes lifting arms extendable from the rear of a vehicle or trailer for hoisting loads. A winch and pulleys drive the system, which can be powered either manually or by a motor.

BACKGROUND OF THE INVENTION

The need exists for an inexpensive, easy-to-use lifting system to facilitate the lifting and moving of heavy objects by a single individual, and which may be installed in a vehicle or trailer. Crane or hoist systems currently used in buildings are generally not adaptable for use in vehicles or trailers.

A vehicle having a self-contained lifting system could allow a single individual to pick-up and deliver heavier packages than is currently possible. Also, the system could be used to secure loads during transport.

SUMMARY OF THE INVENTION

Provided is a lifting system for a vehicle comprising a first track mounted within said vehicle, a second track mounted within said vehicle, a first lifting arm extendable from said first track, a second lifting arm extendable from said second track, a first windable support extendable from said first lifting arm, and a second windable support extendable from said second lifting arm.

Further provided is a lifting system for a vehicle comprising a first drawer slide mounted within said vehicle, a second drawer slide mounted within said vehicle, a first windable support extendable from said first drawer slide, and a second windable support extendable from said second drawer slide.

Further provided is a lifting system for a vehicle comprising a first lifting arm movable from a first position within said vehicle to a second position at least partially exterior to said vehicle, a first windable support for supporting a load from said first lifting arm, a second lifting arm movable from a third position within said vehicle to a fourth position at least partially exterior to said vehicle, a second windable support for supporting said load from said second lifting arm, a lifting platform connected to said first windable support and said second windable support, and means for moving said load from a first vertical position to a second vertical position.

Further provided is a lifting system for a vehicle comprising a first track mounted to said vehicle, a second track mounted to said vehicle, a first lifting arm extendable from said first track, a second lifting arm extendable from said second track, a first windable support extendable from said first lifting arm, a second windable support extendable from said second lifting arm, a gearbox, a first lifting arm driveshaft operatively coupled to said gearbox, wherein said first windable support is coupled to said first lifting arm driveshaft, and a second lifting arm driveshaft operatively coupled to said gearbox, wherein said second windable support is coupled to said second lifting arm driveshaft.

Further provided is a lifting system for a vehicle comprising a first track mounted within said vehicle, a second track mounted within said vehicle, a first bracket for supporting said first track, a second bracket for supporting said second track, a first lifting arm slidably extendable from said first track, a second lifting arm slidably extendable from said second track, a first windable support extendable from said first lifting arm, wherein said first windable support comprises a first strap, a second windable support extendable from said second lifting arm, wherein said second windable support comprises a second strap, a gearbox, a winch arm for supporting said gearbox, wherein said winch arm is connected to said first lifting arm and said second lifting arm, a first lifting arm driveshaft operatively coupled to said gearbox, wherein said first windable support is coupled to said first lifting arm driveshaft, a second lifting arm driveshaft operatively coupled to said gearbox, wherein said second windable support is coupled to said second lifting arm driveshaft, and a lifting platform, wherein said lifting platform is removably mountable within said vehicle, and further wherein said lifting platform is suspendable from said first windable support and said second windable support.

BRIEF DESCRIPTION OF THE DRAWINGS

FIG. 1 is a plan view of a lifting system mounted in a vehicle's cargo area;

FIG. 2 is a side elevation view of the system shown in FIG. 1;

FIG. 3 is an end elevation view of the system shown in FIG. 1;

FIG. 7 is a side elevation view of a lifting arm;

FIG. 8 is plan view of the lifting arm shown in FIG. 7;

FIG. 9 is an elevation view of a cable guide insert for a lifting arm;

FIG. 12 is a plan view of an embodiment of the lifting system that includes a hand crank;

FIG. 13 is a side elevation view of the system shown in FIG. 12;

DETAILED DESCRIPTION OF THE EXAMPLE EMBODIMENTS

Figure 6:
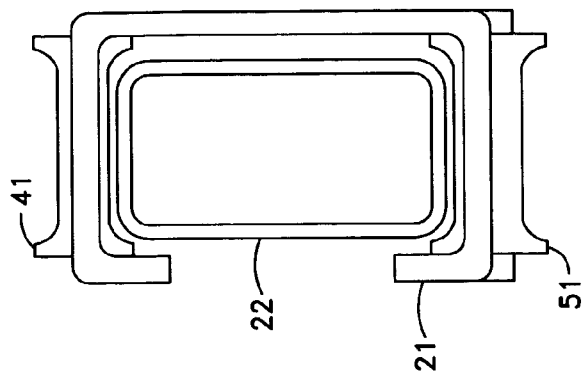
FIG. 6 is an end elevation view of the track shown in FIG. 4.

The lifting system disclosed herein is suitable for mounting within a vehicle or trailer, for example. The system includes lifting arms that are extendible from within the interior of a vehicle to the exterior of a vehicle. For example, the system may be installed in the rear cargo area of a sport utility vehicle such that the lifting arms are extendible from within the cargo area to the exterior of the vehicle beyond a rear door of the vehicle. The lifting arms are capable of supporting a cargo load to be transferred into or out of the vehicle, which may provide for the handling of heavy loads by a single operator, for example, loads that are too heavy for a single person to transfer by hand. Windable supports such as cables, for example, extend from the lifting arms. By operating a winch, the windable supports may be wound around or unwound from pulleys, which allows a cargo load to be lifted or lowered by the system.

The disclosed lifting system is also suitable for use in vehicles designed for the transporting of individuals requiring the use of a wheeled conveyance, such as a wheel chair, for example. The system could be deployed from the rear or side door of such a vehicle and used to lower a lifting platform to a desired level, for example, ground level. An individual in a wheeled conveyance could then position the conveyance upon the lowered platform. The conveyance could then be raised to an appropriate level for entering the vehicle and then moved into the vehicle from the platform.

FIGS. 1, 2 and 3 represent an example embodiment of a vehicle or trailer mounted lifting system in accordance with the present invention. The system may be mounted in a vehicle's cargo area. A first track 11 and second track 21 are mounted to the interior of the vehicle and support the lifting system. A first lifting arm 12, second lifting arm 22, and winch arm 2 are moveable along the tracks 11, 21. The lifting arms 12, 22 are extendable from the tracks 11, 21, which permits the hoisting of objects located outside of the vehicle and, preferably, between the lifting arms 12, 22. The tracks 11, 21 and lifting arms 12, 22 can form telescoping rails when the lifting arms 12, 22 extend from within the tracks 11, 21. Alternatively, the lifting arms 12, 22 may extend from the tracks in other ways, such as by folding out from the tracks 11, 21 or by clipping onto the tracks 11, 21, for example.

The winch arm 2 connects to the first lifting arm 12 by a first static hinge joint 14. Additionally, the winch arm 2 connects to the second lifting arm 22 by a second static hinge joint 24. The hinge joints 14, 24 allow for disconnection of the winch arm 2 from the lifting arms 12, 22 by removal of a pin from each hinge joint 14, 24, similar to removing a pin from a door hinge, for example. Alternatively, the winch arm 2 may be connected to the lifting arms 12, 22 by other means not as easily disconnected as the static hinge joints 14, 24, such as by bolting, for example. Also, the winch arm could be permanently attached to the lifting arms 12, 22, such as by welding, for example.

When connected together as described, the lifting arms 12, 22 and winch arm 2 constitute a lifting carriage, which is moveable along the tracks 11, 21.

The winch arm 2 supports a winch 1, a first driveshaft 3, a first lifting pulley 13, and a second lifting pulley 23. The first driveshaft 3 is operatively coupled to the winch 1 and second lifting pulley 23. The first lifting pulley 13 is directly and operatively coupled to the winch 1. However, in an alternative embodiment, the driveshaft may be operatively coupled to both the first lifting pulley 13 and second lifting pulley 23. The winch may include an attached gearbox for speed reduction or torque multiplication, if desired.

The winch 1 turns the first driveshaft 3 and first lifting pulley 13. When the first driveshaft 3 is turned, it drives the second lifting pulley 23. Windable supports, for example, cables, extend from the lifting rails and are connected to the lifting pulleys 13, 23. Turning the lifting pulleys 13, 23 causes a load supported by the windable supports to be raised or lowered.

The winch 1 and optional gearbox (if present) may be manually powered, for example, driven by a hand crank or a ratcheting wrench, for example, a ⅜ inch or a ½ inch ratcheting wrench. Alternatively, the winch 1 may driven by a hand-held powered device, such as an electric drill which could be a cordless drill, for example. The winch 1 may also be driven by an electric motor coupled to the winch 1.

The lifting arms 12, 22 may fully or partially enclose the windable supports. The windable supports may be comprised of cable, rope, strap, or other flexible material, such as woven, braided, or otherwise linked material, such as chain, for example. The lifting arms further include a plurality of pulleys for guiding and supporting the windable supports. FIG. 2 shows a first windable support 15 and a second windable support 16 extending from the first lifting arm 12. Turning the first lifting pulley 13, via the winch 1, will cause the windable supports 15, 16 to wind around or unwind from the first lifting pulley 13, raising or lowering any connected load. A similar pair of windable supports (not shown) would extend from the second lifting arm 22 and be driven by the second lifting pulley 23.

FIGS. 7 and 8 show a plurality of pulleys located within the lifting arms 12, 22 for guiding and supporting windable supports. In the embodiment as shown, the second lifting arm 22 has a first support pulley 61 for supporting a windable support and a second support pulley 62 for supporting another windable support. The second lifting arm 22 also has a first discharge pulley 63 and a second discharge pulley 64. The discharge pulleys 63, 64 guide windable supports out of the second lifting arm 22 and down to the connected load. The first lifting arm 12 would include similar support and discharge pulleys. In alternative embodiments, further support pulleys could be included along the length of both lifting arms 12, 22 for windable supports included therein.

In FIGS. 7 and 8, an additional driveshaft 66 can be seen in the second lifting arm 22. The operation of a system having a similar additional driveshaft is discussed further below, regarding a second driveshaft 71 located in the first lifting arm 12 as shown in FIGS. 12 and 13.

Figure 4:
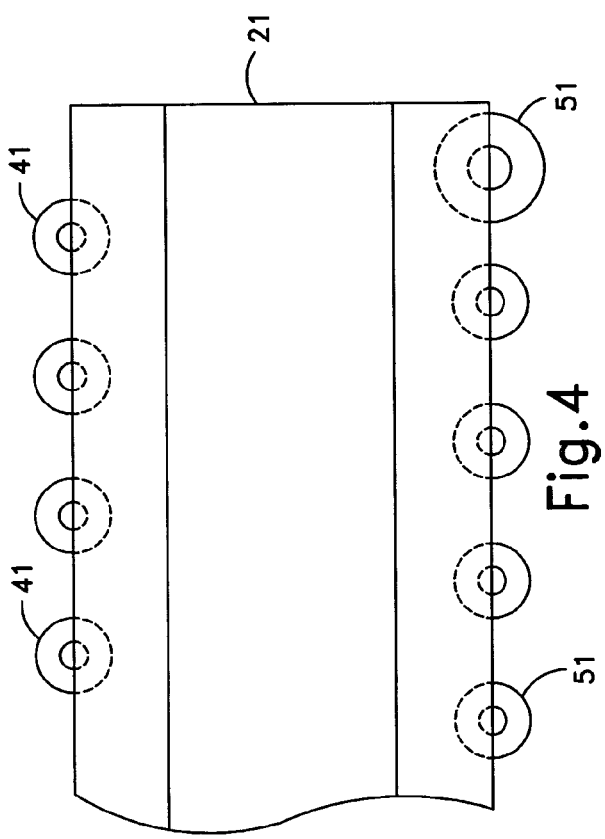
FIG. 4 is a side elevation view of a track for supporting a lifting arm.
Figure 5:
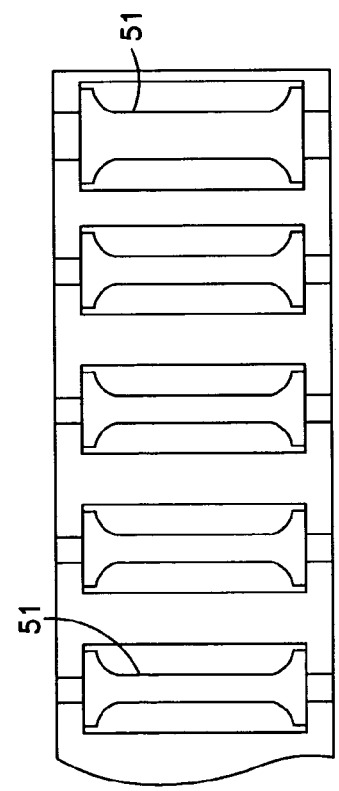
FIG. 5 is a bottom plan view of the track shown in FIG. 4.

FIGS. 4, 5, and 6 show the roller system that is a part of each track 11, 21, and which allows the lifting arms 12, 22 to move within the tracks 11, 21. The second track 21 is shown in detail. It has a plurality of upper rollers 41 and lower rollers 51. The second lifting arm 22 slides along the upper rollers 41 and lower rollers 51 as it is moved within the second track 21.

The "C" like shape of the tracks 11, 21 can be seen in FIG. 6. Configuring the tracks 11, 21 in such a manner allows for the lifting arms 12, 22 to be captive within the tracks 11, 21 while permitting the winch arm 2 to move with the lifting arms 12, 22 along the length of the tracks 11, 21.

Figure 11:
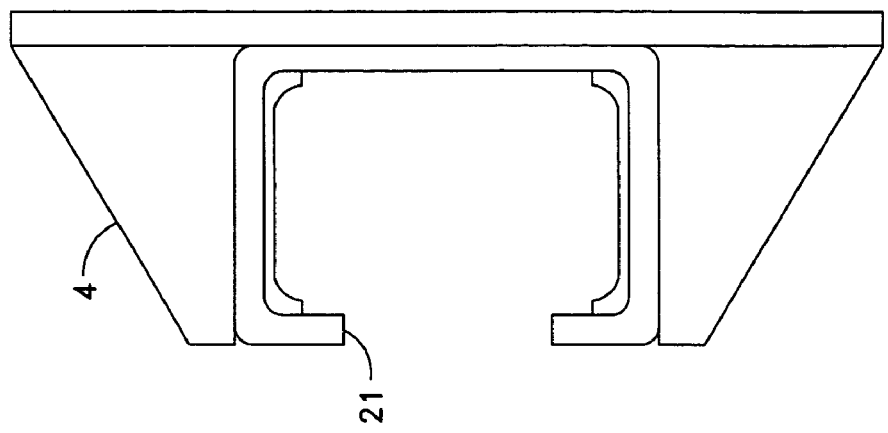
FIG. 11 is an end elevation view of the track and brackets shown in FIG. 10.
Figure 10:
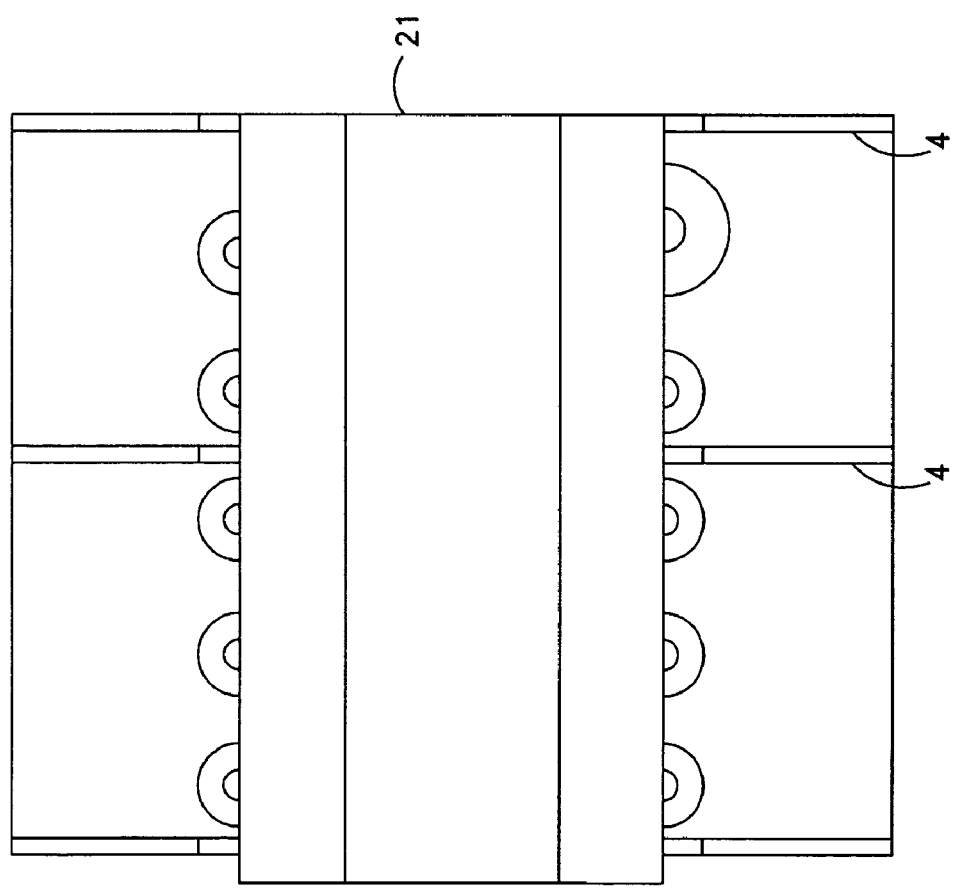
FIG. 10 is a side elevation view of a track for supporting a lifting arm that further includes reinforcing brackets.

FIGS. 3, 10, and 11 show how the tracks 11, 21 may be supported by reinforcing brackets 4. FIG. 10 shows the second track 21 supported by a plurality of reinforcing brackets 4. Use of reinforcing brackets 4, especially near the rearward ends of the tracks 11, 21 would help to maintain the structural integrity of the tracks 11, 21 when they are subjected to forces exerted by the lifting arms 12, 22 when cargo is raised or lowered.

In a current embodiment, the tracks 11, 21 and lifting arms 12, 22 may be replaced with two heavy-duty drawer slides capable of withstanding the loads to be handled by the system.

FIGS. 12 and 13 show how a current embodiment of the lifting system may be manually driven from the exterior of the vehicle. A second driveshaft 71 runs the length of the first lifting arm 12. Alternatively, the second driveshaft could be located within the second lifting arm 22. The second driveshaft is coupled to the winch's 1 gearbox. Turning the second driveshaft 71 will cause the winch 1 to turn the first driveshaft 3 and first lifting pulley 13. A direct gear wheel 72 could be connected to the end of the second driveshaft 71, which would allow an operator to turn the second driveshaft 71 directly. In addition, a right angle gear wheel 73 could be added, which would permit a turning motion around an axis substantially perpendicular to the second driveshaft 71 to turn the second driveshaft 71. By including two gear wheels 72, 73 at substantially right angles to each other, a user would have two angles from which to operate the system. Additional gear wheels, not shown, could be added to the system for allowing additional points from which to operate the system. The second driveshaft 71 is also shown in FIGS. 7 and 8.

A hand crank 74 could be inserted into either the direct gear wheel 72 or right angle gear wheel 73 and used to turn the second driveshaft 71. In addition to a hand crank 74, a ratcheting wrench, for example, a ⅜ inch or a ½ inch ratcheting wrench, or an electric drill, such as a cordless drill, for example, could be inserted into the gear wheels 72, 73 to turn the second driveshaft 71. Alternative devices could be used to drive the system, such as an electric motor, for example.

FIG. 9 shows an example of an insert 65 that could be placed within the lifting arms 12, 22. The insert 65 has holes through which the second driveshaft 71 and two lifting cables would pass. A plurality of inserts 65 could be placed within one or both lifting arms 12, 22 to keep the lifting cables and/or additional drive shaft such as the second driveshaft 71 in place within the lifting arms 12, 22. In an example embodiment, the insert 65 is comprised of nylon. As an alternative to the insert 65, tubes, for example plastic tubes, could be installed within the lifting arms 12, 22 to prevent the lifting cables from becoming entangled.

Figure 14:
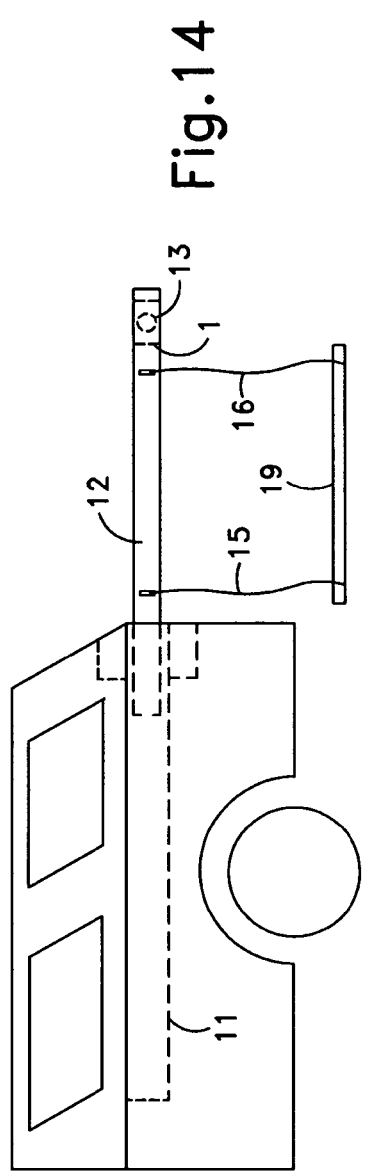
FIG. 14 is a side elevation view of a lifting system having a rear-mounted winch arm.

FIGS. 2, 3 and 14 show a lifting platform 19 suspended from the lifting system. The lifting platform 19 supports cargo to be loaded into the vehicle or trailer in which the lifting system is installed. In a vehicle mounted system, the lifting platform could be a removable panel from the vehicle's interior, such as a removable floor panel, for example. A vehicle having the lifting system could include a single removable panel, or a plurality of panels, that may be used as lifting platforms 19. Alternatively, the lifting platform 19 may be a cargo skid, such as a wooden cargo skid, for example, or it may be a specially designed platform.

In FIG. 2, the tracks 11, 21 each contain a first disconnect slot 17 at the rearward end of the system and second disconnect slot 18 at the front of the system. The disconnect slots 17, 18 are comprised of slots in the upper part of the tracks 11, 21 that are wide enough to allow the winch arm 2 to be lifted through them.

When loading two or more lifting platforms 19 having cargo loads into a vehicle, the first lifting platform is deposited in the forward part of the vehicle's cargo area. The lifting platform 19 is lowered to the floor of the vehicle and the four lifting cables (15, 16, and two not shown) are disconnected from the platform 19. The lifting carriage is then rolled forward through the tracks 11, 21 until the winch arm 2 lines up with the first disconnect slots 18. The pins are then removed from the static hinge joints 14, 24 and the winch arm 2 is lifted through the first disconnect slots 18. The first lifting pulley 13 is then slipped off of the winch 1 and the second lifting pulley 23 slipped off of the first driveshaft 3. The winch arm 2 is then taken to the rear of the vehicle and the lifting arms 12, 22 rolled through the tracks 11, 21 to the rear of the vehicle. The first lifting pulley 13 is placed back onto the winch 1 and the second lifting pulley 23 onto the first driveshaft 3. The winch arm is then lowered through the second disconnect slots 17 for reattachment to the lifting arms 11, 21. The lifting carriage is then ready to move a second cargo load, if desired.

FIG. 14 shows an example embodiment of a lifting system in accordance with the present invention in which the winch arm 2 (FIG. 1) is located at the rearward end of the first lifting arm 12 and second lifting arm 22 (FIG. 1). The approximate location of the winch 1 and first lifting pulley 13 can be seen. In this embodiment, the disconnect slots 17, 18 (FIG. 2) are not shown because the winch arm 2 is not located directly between the tracks 11, 21 (FIG. 1). In addition, the second driveshaft 71 (FIGS. 7, 8, 12, and 13) is not shown, because an operator would have access to and could directly drive the winch 1 from outside of the vehicle. Accordingly, the second drive shaft 71, which is operatively coupled to the winch and accessible from outside of the vehicle, is unnecessary.

Figure 15:
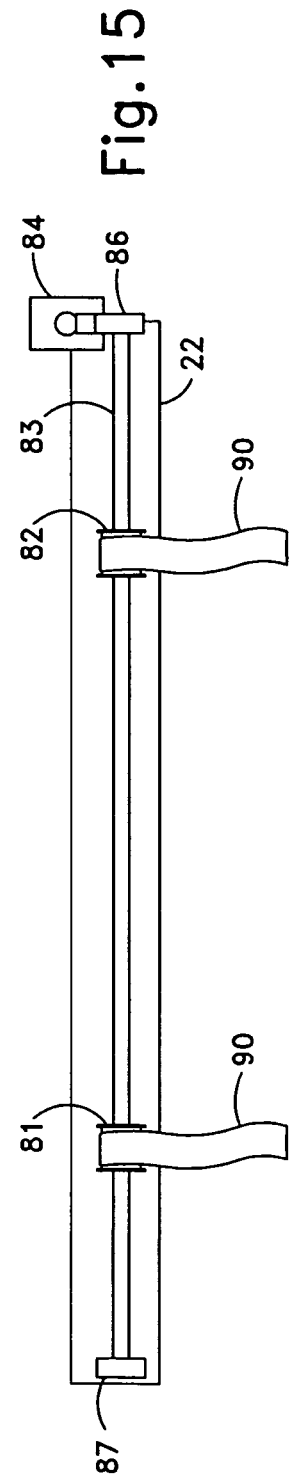
FIG. 15 is a side elevation view of an embodiment of the lifting system having a lifting arm driveshaft and straps for windable supports.
Figure 16:
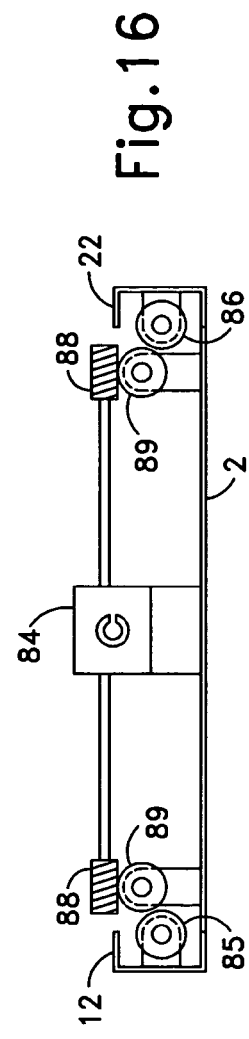
FIG. 16 is an end elevation view of the embodiment shown in FIG. 15.

FIGS. 15 and 16 show an example embodiment of a lifting system in accordance with the present invention. The lifting arms 12, 22 are preferably made of C-channel instead of rectangular tubing. However, rectangular tubing could also be used. In this embodiment, the winch arm 2 is located at the rearward end of the first lifting arm 12 and second lifting arm 22. The winch arm 2 could be connected to the lifting arms 12, 22 with static hinge joints as discussed above.

In this example embodiment, a gearbox 84 is located on the winch arm 2 for driving the system. The system, for example, could be driven by any of the methods discussed above. The gearbox 84 drives two worm gears 88. The worm gears 88 drive gear wheels 89. The gear wheels, in turn, drive a first lifting arm gear 85, located on the first lifting arm 12, and a second lifting arm gear 86, located on the second lifting arm 22. The gear wheels 89 may have teeth, for example, for engaging the lifting arm gears 85, 86. The gear wheels 89 may engage the lifting arm gears 85, 86 by other methods, such as through belts or chains, for example.

The gearbox 84, gear wheels 89, and lifting arm gears 85, 86 could be supported from brackets connected to the winch arm 2 and/or a lifting arm 12, 22, depending on the location of the system component to be supported.

Use of worm gears 88 could decrease the likelihood that a load left in a suspended position would unexpectedly begin to drop. The worm gears 88 would tend to resist turning due to forces generated by the load, which otherwise could result in unexpected downward vertical movement of the load. However, the worm gears would permit the turning of the lifting arm gears 85, 86 by the gearbox 84, thereby allowing for controlled vertical movement of the load.

As can be seen in the embodiment of FIG. 15, the second lifting arm gear 86 is connected to a lifting arm driveshaft 83. When the gearbox 84 drives the second lifting arm gear 86, the lifting arm driveshaft 83 will be made to rotate. Accordingly, the lifting arm driveshaft 83 is operatively coupled to the gearbox 84 through the worm gear 88, gear wheel 89, and second lifting arm gear 86. An additional lifting arm driveshaft, not shown in FIG. 15, would also be present on the first lifting arm 12 and connected to the first lifting arm gear 85.

Attached to the lifting arm driveshaft 83 are a first spool 81 and a second spool 82. Turning the first lifting arm driveshaft 83 will cause the spools 81, 82 to turn. Wound around the spools 81, 82 are windable supports 90, such as a cables or nylon lifting straps, for example. Turning the lifting arm driveshaft 83 will cause the windable supports 90 to wind around or unwind from the spools 81, 82, raising or lowering a load connected to the windable supports 90. A similar pair of spools and windable supports would be present on the first lifting arm 12 and be driven by the first lifting arm gear 85.

Auxiliary lifting arm gears 87 could be located at the front end of each lifting arm 12, 22. This would allow the winch arm 2 to be moved from the rear of the lifting arms 12, 22 to the front of the lifting arms 12, 22. Such a configuration may be desirable when moving objects that are wider than the distance between the lifting arms, for example.

In an example embodiment, the worm gears 88, gear wheels 89, first lifting arm gear 85, and second lifting arm gear 86 could be replaced with a first lifting arm gearbox located on the first lifting arm 12 and a second lifting arm gearbox located on the second lifting arm 22. The first lifting arm gearbox and second lifting arm gearbox could transmit forces at a right angles, thereby directly transmitting rotational driving forces from the gearbox 84 located on the winch arm 2 to driveshafts operatively coupled to the first and second lifting arm gearboxes, respectively. The driveshafts would be located on the lifting arms 12, 22, such as the lifting arm driveshaft 83, for example.

Brackets having bearings for supporting the lifting arm driveshaft 83 from the second lifting arm 22 are not shown. However, such brackets may be included, if desired. A further embodiment could include drawer slides instead of tracks 11, 21 and lifting arms 12, 22. Such an embodiment could be considered to have drawer slide driveshafts instead of lifting arm driveshafts.

The invention has been described hereinabove using specific examples; however, it will be understood by those skilled in the art that various alternatives may be used and equivalents may be substituted for components or steps described herein, or the order of steps may be changed, or substitutes for the described components provided, without deviating from the scope of the invention. Modifications may be necessary to adapt the invention to a particular situation or to particular needs without departing from the scope of the invention. It is intended that the invention not be limited to the particular implementation described herein, but that the claims be given their broadest interpretation to cover all embodiments, literal or equivalent, covered thereby.

What is claimed is:

1. A lifting system for a vehicle, comprising:
    a first track mounted within said vehicle;
    a second track mounted within said vehicle;
    a first lifting arm extendable from said first track;
    a second lifting arm extendable from said second track;
    a first windable support extendable from said first lifting arm;
    a second windable support extendable from said second lifting arm;
    a gearbox;
    a winch arm for supporting said gearbox, wherein the winch arm extends from the first lifting arm to the second lifting arm;
    a first lifting arm driveshaft having a fixed length and being operatively coupled to said first windable support and said gearbox for driving said first lifting arm driveshaft, wherein said first windable support is coupled to said first lifting arm driveshaft; and
    a second lifting arm driveshaft having a fixed length and being operatively coupled to said second windable support and said gearbox for driving said second lifting arm driveshaft, wherein said second windable support is coupled to said second lifting arm driveshaft,
    wherein said winch arm, the gearbox, the first lifting arm, the second lifting arm, the first lifting arm driveshaft, and the second lifting arm driveshaft are linearly moveable together relative to the first track and the second track, from a first position to a second position, as the first lifting arm and the second lifting arm are extended.

2. A lifting system for a vehicle as set forth in claim 1, wherein the first track includes a first plurality of rollers that supports the first lifting arm, and the second track includes a second plurality of rollers that supports the second lifting arm.

3. The lifting system as set forth in claim 2, wherein at least one of said first windable support and said second windable support comprises a strap.

4. The lifting system as set forth in claim 3, further comprising a lifting platform, wherein said lifting platform is removably mountable to said vehicle, and further wherein said lifting platform is suspendable from said first windable support and said second windable support.

5. A lifting system for a vehicle, comprising:
    a first plurality of rollers;
    a first elongated track mounted to said vehicle operatively connected to said first plurality of rollers;
    a second plurality of rollers;
    a second elongated track mounted to said vehicle operatively connected to said second plurality of rollers;
    a first bracket mounted to the vehicle for supporting said first track;
    a second bracket mounted to the vehicle for supporting said second track;
    a first lifting arm, supported by said first plurality of rollers, and horizontally extendable from and along said first track and movable from a first position within said vehicle to a second position at least partially exterior to said vehicle, wherein said first track and said first lifting arm form a first telescoping rail;
    a second lifting arm, supported by said second plurality of rollers, and horizontally extendable from and along said second track and movable from a third position within said vehicle to a fourth position at least partially exterior to said vehicle, wherein said second track and said second lifting arm form a second telescoping rail;
    a first windable support extendable from said first lifting arm at a first location;
    a third windable support extendable from said first lifting arm at a third location;
    a second windable support extendable from said second lifting arm at a second location;
    a fourth windable support extendable from said first lifting arm at a fourth location;
    a gearbox;
    a winch arm for supporting said gearbox, wherein the winch arm extends from the first lifting arm to the second lifting arm;
    a first lifting arm driveshaft operatively coupled to said gearbox, wherein said first windable support and said third windable support are coupled to said first lifting arm driveshaft for winding said first and third supports; and
    a second lifting arm driveshaft operatively coupled to said gearbox, wherein said second windable support and said fourth windable support are coupled to said second lifting arm driveshaft for winding said second and fourth supports,
    wherein the winch arm, the gearbox, the first lifting arm, the second lifting arm, the first lifting arm driveshaft, and the second lifting arm driveshaft are linearly moveable together relative to the first track and the second track as the first lifting arm and the second lifting arm are horizontally extended.

6. A lifting system for a vehicle that is a road vehicle, comprising:
    a platform;

a first track mounted within said vehicle;
a second track mounted within said vehicle;
a first lifting arm extendable from said first track;
a second lifting arm extendable from said second track;
a first windable support extendable from said first lifting arm;
a third windable support extendable from said first lifting arm;
a second windable support extendable from said second lifting arm;
a fourth windable support extendable from said second lifting arm;
a gearbox;
a winch arm for supporting said gearbox, wherein the winch arm extends from the first lifting arm to the second lifting arm;
a first lifting arm driveshaft operatively coupled to said gearbox, wherein said first windable support and said third windable support are each coupled to said first lifting arm driveshaft at different locations for winding said first and third windable supports; and
a second lifting arm driveshaft operatively coupled to said gearbox, wherein said second windable support and said fourth windable support are each coupled to said second lifting arm driveshaft at different locations for winding said first and fourth windable supports, wherein
wherein the first lifting arm, the second lifting arm, and said platform are linearly moveable together relative to the first track and the second track as the first lifting arm and the second lifting arm are extended along the first track and the second track, respectively, and wherein
said first windable support, said second windable support, said third windable support, and said fourth windable support are each connected to said platform at different points on said platform that are distant from each other.

* * * * *